Figure 1:
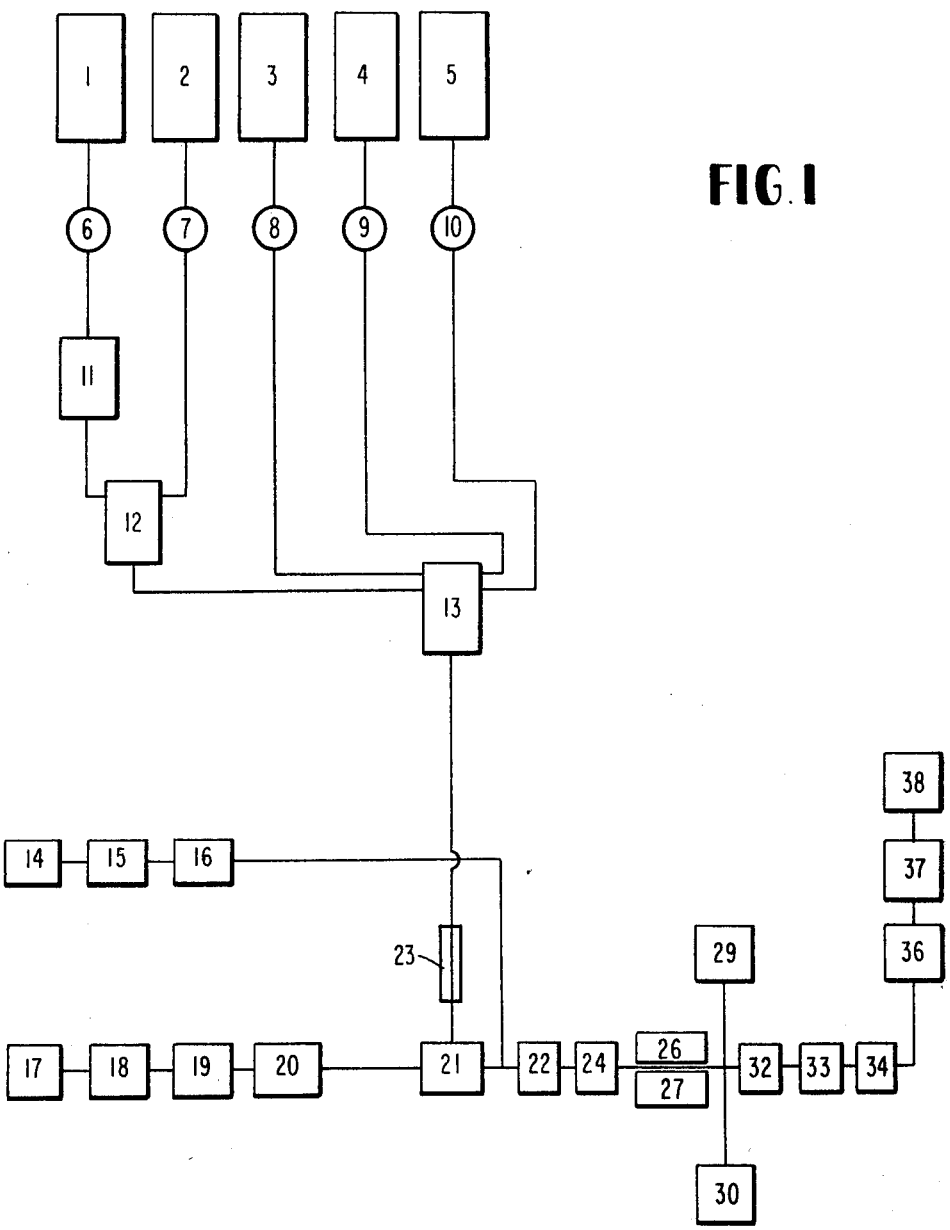

United States Patent [19]
Brüning et al.

[11] 4,042,314
[45] Aug. 16, 1977

[54] APPARATUS FOR THE CONTINUOUS MANUFACTURE OF PHENOLIC RESIN FOAM IN ENDLESS SHEETS

[75] Inventors: Klaus Brüning; Hans Jünger; Wolfgang Pungs; Peter Rheinfeld, all of Troisdorf; Franz Weissenfels; Michael Wienand, both of Siegburg, all of Germany

[73] Assignee: Dynamit Nobel Aktiengesellschaft, Germany

[21] Appl. No.: 513,404

[22] Filed: Oct. 9, 1974

Related U.S. Application Data

[62] Division of Ser. No. 311,913, Dec. 4, 1972, Pat. No. 3,885,010.

[30] Foreign Application Priority Data

Dec. 2, 1971 Germany ............................... 2159726

[51] Int. Cl.² ............................................. B29D 27/04
[52] U.S. Cl. ...................................... 425/89; 425/149; 425/224; 425/329; 425/817 C
[58] Field of Search ................... 425/4 C, 817 C, 371, 425/372, 149, 150, 115, 141, 329, 224, 471, 89; 259/4 R, 6; 222/132, 145; 264/46.5, 45.8, 147, 48, 52

[56] References Cited

U.S. PATENT DOCUMENTS

| | | | |
|---|---|---|---|
| 3,039,887 | 6/1962 | Schneider et al. | 425/115 X |
| 3,144,376 | 8/1964 | Plumberg et al. | 425/371 X |
| 3,152,361 | 10/1964 | Edwards | 425/817 C X |
| 3,178,768 | 4/1965 | Edberg | 425/4 C |
| 3,566,448 | 3/1971 | Ernst | 425/4 C |
| 3,627,275 | 12/1971 | Gusmer | 259/4 R |
| 3,706,516 | 12/1972 | Kisteneich et al. | 425/4 C X |
| 3,734,668 | 5/1973 | Porter | 425/4 C X |
| 3,773,876 | 11/1973 | Rath et al. | 425/4 C X |
| 3,812,227 | 5/1974 | Blackwell et al. | 425/4 C X |

*Primary Examiner*—Francis S. Husar
*Assistant Examiner*—Mark Rosenbaum
*Attorney, Agent, or Firm*—Craig & Antonelli

[57] ABSTRACT

An apparatus for the continuous manufacture of phenolic resin foam in an endless sheet which includes mixing means for expandable liquid phenolic resin with a blowing agent and an acid-containing curing agent, optionally with the addition of additives, and means for processing the mixture in a temperature-controllable double belt press. The apparatus also comprises a device for cooling the phenolic resin to a temperature of from about 8° to about 15° C., a mixing section for admixing a blowing agent under a high pressure with said resin to form a resin premix, for mixing said resin premix with a curing agent resin to form a resin premix, and mixing said resin premix with a curing agent and other foam additives to form a curable reaction mixture, an applicator device for continuously applying said mixture uniformly onto a moving substrate, a unit for covering the mixture on said substrate with a continuous protective layer, a conveyor belt for passing the covered mixture into the double belt press, means for heating the belt press to promote foaming of the mixture under pressure until a desired sheet thickness has been obtained and a device for measuring the foam pressure within said belt press so that the foaming pressure and also the sheet thickness can be regulated.

13 Claims, 3 Drawing Figures

APPARATUS FOR THE CONTINUOUS MANUFACTURE OF PHENOLIC RESIN FOAM IN ENDLESS SHEETS

CROSS REFERENCE TO RELATED APPLICATION

This application is a divisional of application Ser. No. 311,913 filed Dec. 4, 1972, now U.S. Pat. No. 3,885,010.

This invention relates to an apparatus for the continuous manufacture of phenolic resin foam in endless sheets including means for mixing expandable liquid phenolic resins with a blowing agent and an acid-containing during agent, optionally with an admixture of additives, and means for processing the mixture in a temperature-controllable double belt press.

It is conventional to spray expandable mixtures under pressure out of a nozzle for the continuous production of foamed plastic sheets with the use of a double belt press. The nozzle is moved, in this process, at a high velocity (e.g. about 200 m./min. and thereabove) to and fro over the belt at right angles to the feeding direction of the belt. In order to attain a more uniform distribution, it is also known to apply the foam mixture, by means of a reciprocating device which moves slowly at right angles to the feeding direction, in a rough preliminary distribution to the lower belt of the double belt press, and then to pass the thus-applied mixture through the gap (of adjustable thickness) formed between a roll and a support, during which step the mixture is finely distributed across the entire width of the belt to the desired uniform layer thickness. During the further pass through the double belt press, the foaming and curing of the reaction mixture are then carried out.

It is the object of the present invention to improve the conventional apparatus for the production of foamed sheets, particularly those intended for the manufacture of phenolic resin foam materials, in such a manner that a continuous process is made possible starting with the mixing of the individual substances to obtain the expandable reaction mixture up to the finished, worked-up sheet of foam material, within an economical time period and by means of economical devices.

In accordance with the operation of the apparatus of this invention, the expandable phenolic resin is cooled to a processing temperature of preferably about 8° to about 15° C. Thereafter, the blowing agent, which is under a high pressure, is admixed thereto, optionally under additional cooling; the resin-blowing agent premix is then mixed with additives and curing agents and continuously applied in a reciprocating manner and uniformly distributed onto a moving substrate entering the double belt press; the premix on the substrate is covered with a top layer; then, in the heat of the heated double belt press, the mixture is continuously expanded in the vertical direction until the desired sheet thickness has been obtained and is sufficiently cured at an adjustable blowing pressure of preferably about 0.1 to about 0.3 atmosphere gauge until the sheet is discharged from the double belt press. Thereafter, the phenolic resin foam sheet is passed to further processing, such as foaming into panels.

By means of the apparatus of this invention, whereby special emphasis is placed on maintaining specific operating temperatures during the mixing, distribution, and expansion of the substances, it is made possible to manufacture, in a continuous procedure, endless foam sheets of phenolic resin. By the temperature control and pressure regulation in the double belt press, the foaming period and the curing time are kept within such limits that economically feasible constructional lengths of the double belt press are made possible and, at the same time, a phenolic resin foam material is obtained which is of a uniform and fine-pored structure.

Figure 3:
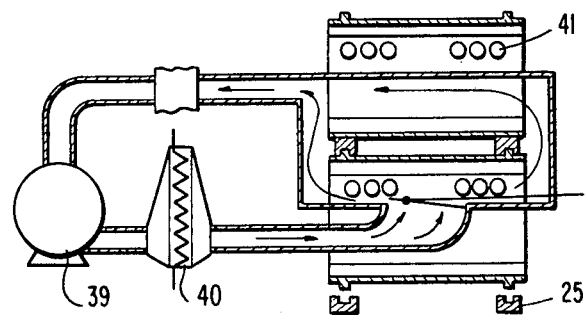
Figure 2:
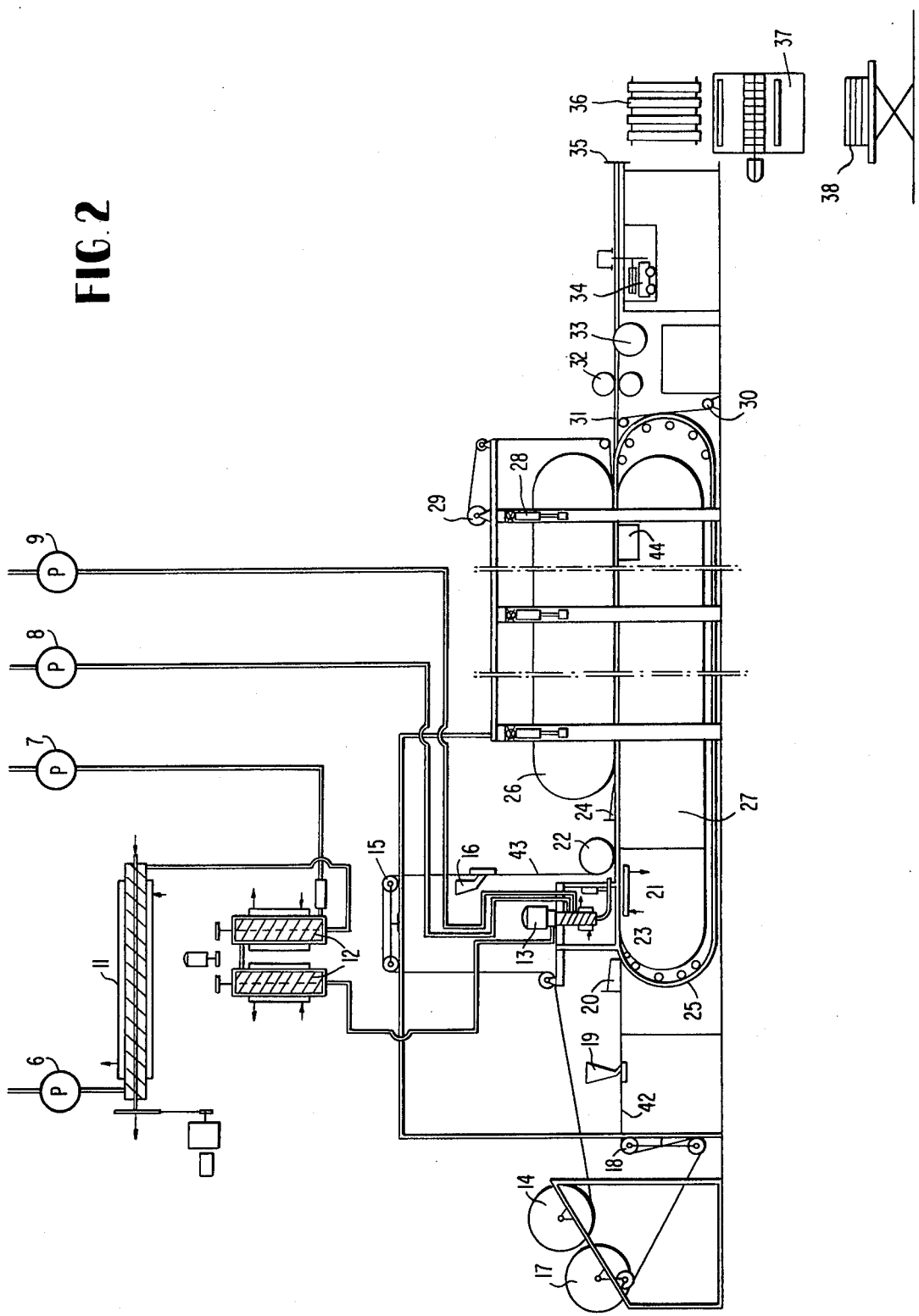

Additional features and advantages of the process and the apparatus of this invention for effecting the continuous manufacture of phenolic resin foam sheets are described in greater detail with reference to specific embodiments and to the accompanying drawings in which:

FIG. 1 is a flow diagram illustrating the process carried out by the apparatus of this invention for the continuous production of phenolic resin foam sheets;

FIG. 2 schematically shows an apparatus for producing the phenolic resin foam sheets with a double belt press; and FIG. 3 shows the heating mechanism of the double belt press of FIG. 2.

As shown in FIG. 1, the components for producing the phenolic resin foam are stored in storage tanks. In tank 1 is an expandable phenolic resin, e.g. the phenolic foaming compound produced by Dynamit Nobel A.G. and designated T 612 S and a propellant e.g. n-pentane, is in tank 2. In tank 3 an acid curing agent e.g. a mixture of 40% by weight of p-toluenesulfonic acid, 20% by weight of concentrated sulfuric acid, and 40% by weight of water, is stored and there are furthermore provided the tank 4 for liquid to pasty modifiers, e.g. trichloroethyl phosphate or mineral oils, or mixtures of boric acid with such substances, and the tank 5 for pulverized additives, e.g. gypsum (plaster of Paris). These components are fed via metering devices 6, 7, 8, 9, 10, such as, for example, dosing pumps, associated with the individual tanks, to the mixing device 12 or 13 as shown. The basic component, the phenolic resin taken from tank 1, is subjected, during the metering procedure (i.e., when passing from tank 1 via the metering pump 6 into the premixing device 12) to an intense cooling in a screw-type indirect cooler 11. The coolant employed in the cooler has a cooling temperature of about +4° C. to about −4° C., whereby the processing temperature of the phenolic resin is attained. This processing temperature ranges between about 8° and about 15° C.; whereas the inlet temperature of the resin from the storage tank is from about 20° to 25° C. In order to be able to obtain an optimum cooling of the phenolic resin, the number of revolutions of the screw conveyor disposed in the screw-type cooler 11 can be widely varied by means of a variable speed gear. Additionally, pressure equalization is obtained in the cooler 11 between the inlet and outlet thereof, via this speed control of the conveyor. The screw conveyor and the cylinder are both cooled. The thus-cooled phenolic resin 1 then enters a premixing device 12, wherein, with the addition of blowing agent 2, e.g. n-pentane, and intense, extremely fine distribution of the blowing agent takes place throughout the premixing device 12, which is equipped with a double-vane helix mixer. The blowing agent 2 is fed or introduced via a metering pump 7 and a spring-loaded valve arranged at premixing device 12, under a pressure of about 50 atmospheres guage. Due to this high pressure, the blowing agent is atomized and, at the same time, the phenolic resin 1 is prevented from flowing into the blowing agent feed conduit.

In order to mix the phenolic resin with the blowing agent, the premixing device 12 is preferably constructed in the form of two series-connected premixing chambers 12' (as shown in FIG. 2). The two premixing chambers employed can be cooled with a coolant, preferably with a temperature of +4° to −4° C. However, the two premixing chambers 12' may be cooled individually, so that, when the thus-introduced phenolic resin has already been sufficiently cooled, the cooling of the first premixing channel 12' can be omitted. Thereby, any rise or increase in viscosity which may occur due to the fact that the resin is cooled too much is avoided and an optimum mixing is attained. The second premixing chamber 12' is cooled in any event, in order to avoid an increase in the temperature of the mixture, caused by frictional heat, to above the temperature value still feasible for processing.

The mixing of all components into a curable and foamable composition takes place subsequently in the mixing device 13. During start-up of the plant, the components are to be fed to the mixing device 13 in the following succession:
1. metered feeding of the additives from tanks 4 and 5;
2. metered feeding of the phenolic resin - pentane mixture obtained from tanks 1 and 2;
3. metered feeding of the curing agent from tank 3.

When charging the final mixing device 13 with the required components, it is to be considered that the mixing procedure is to be effected over a longer production period of, for example, 120 hours, for the continuous manufacture of endless sheets, without any disturbances. For this purpose, a specially developed mixing mechanism is utilized which makes it possible to conduct continuous mixing without any impairment of the mixing procedure due to premature curing of the mixture. In the mixing device 13, the mixing chamber is subdivided into a chamber for the metered introduction of the phenolic resin-blowing agent mixture and into a mixing chamber for the metered feeding of the curing agent and the additives. A single, continuous mixing shaft effects the intermixing in this device. By the formation of a pressure gradient in the junction gap between the two chambers, the return of the curable mixture into the chamber containing the mixer shaft bearings is prevented, so that clogging of the mixer shaft is forestalled. A device of this type is disclosed in applicant's copending application Ser. No. 231,112 filed on Mar. 2, 1972.

The discharge of the reaction mixture from the mixing device 13 takes place via the flexible foaming hose 23, the mouth of which is reciprocated by means of a reciprocating mechanism, e.g. a reciprocatory gear, over the continuously fed substrate or base sheet 42 shown in FIG. 2. This results in a preliminary distribution of the resin mixture. The final distribution of the mixture takes place by way of the distributing roll 22 which makes it possible to distribute the mixture accurately on the sheet 42 and which functions simultaneously as a guide roll for the continuously entering top sheet 43.

The quality of the product, i.e. the structure and the homogeneous distribution of the components, depends particularly upon the extremely fine distribution of the blowing agent in the phenolic resin.

This distribution is achieved by the provision of, for example, the two premixing chambers, each having a rotational mixing speed that is variable, so that an optimal speed corresponding to the weight rate of flow, or throughput, of the phenolic resin can be set or adjusted (for instance within the range of 800 to 1,600 revolutions per minute).

In addition thereto, the cooling of the premixing chambers 12 has the effect of influencing the temperature of the mixture and the mixing intensity since the mixing capacity, or mixability, between resin and blowing agent (for example n-pentane) depends to a large extent on the resin temperature and since with an increasing temperature, and consequently decreasing velocity, the mixture formation is facilitated. The mixture produced in this manner from resin and blowing agent is processed, or treated in the final mixing device 13 to a reactive and, respectively, hardenable mixture with the addition of the hardener or curing agent and other additives.

In connection with this mixture formation, care should be taken to insure that the temperature of the mixture discharging from the final mixing device 13 will not exceed 30° C.

The optimal mixing effect with, at the same time, a short starting time (the time between the beginning of the mixture up to the recognizable volume increase) is obtained in the range of between 28° C. and 30° C. Above that temperature, a so-called frothing will set in. This phenomenon must be prevented with absolute certainty since in that case, in the process described, a uniform mixture distribution over the distributing roll 22 is no longer possible inasmuch as material accumulations are formed in the area of the reversing points of the mixture hose 23 being moved with the aid of a lifting or reciprocating gear.

In order to meet the requirement for limiting the temperature of the finished mixture to 30° C., the temperature of the phenolic resin being employed must amount to approximately 5° C. to approximately 12° to 15° C. for a weight rate of flow of, for example, from about 1 kg/min to about 5 kg/min.

The higher phenolic resin temperature is suitable for the greater weight rate of flow or throughput and is due to the fact that, with the variable mixing chambers, the residence time is reduced and the attainment of an optimal mixture is guaranteed by the reduction of the resin viscosity.

As shown in FIG. 2, after the mixture has been disposed, in the unexpanded (or pre-expanded) form, between the protective layers provided by sheets 42, 43 and has entered the belt mold formed by the upper belt 26 and the lower belt 27 of the double belt press, the actual foaming and curing procedure begins. The foaming and curing procedure is initiated by the exothermic heat of reaction and by the heat of the heated belt press. The mixture is expanded under the formation of a more or less slightly increasing foaming angle. The belt speed, in this connection, is adjusted so that a continuous and vertical foaming of the mixture is ensured. The foaming process takes place until the thickness set by the belt spacing is achieved, and thereafter the mixture commences the curing process without any additional foaming movements, under the buildup of a foaming pressure. The foaming pressure is measured by conventional measuring means 44 and adjusted in such a manner that it does not exceed about 0.3 atmosphere gauge by hydraulic cylinders 28; preferably, this pressure ranges between about 0.1 atmosphere gauge and about 0.3 atmosphere gauge. The curing process takes about 6 to about 9 minutes, depending on the resin charge being processed.

The quality of the thus-produced sheet of foam material can be affected during this curing process by way of the belt temperature, the reactivity of the phenolic resin and/or the exothermic heat of reaction thereof during the foaming and curing reaction, the proportion of propellant, and the proportion of curing agent, and the additives. The endless phenolic resin foam sheet 31, sufficiently cured after leaving the belt press, is provided with the protective cover layers formed by sheets 42 and 43. These cover layers can be fashioned as adherent or non-adherent cover layers, so that they can be removed, if desired.

For the production of sheet stock without cover layers, a non-adherent release paper or liner material is introduced in the same manner as a normally adherent cover layer, and pulled off continuously by means of the device 29, 30 after the foamed sheets have exited from the belt press. The phenolic resin foam sheets produced without adherent cover layers are distinguished, in contrast to the sheets cut from a foamed block, by a particularly smooth, dust-free surface which therefore does not impede any adhesive effect.

The sheets produced according to this invention with or without adherent cover layers exhibit a density gradient which improves the antislip behavior. The density of the phenolic resin foam increases from the center of the sheet to the external zones by about 20%.

Directly downstream of the double belt press, there follows the devices for the finishing of the material, denoted by 33, 34 and for the grooving of the sheets, denoted by 32, 36, and 37. It proved to be advantageous, for the avoidance of warping phenomena, especially when the phenolic resin foam panels are used in the construction field, to provide the phenolic resin foam panels with longitudinal and transverse grooves. These grooves are suitably disposed in a parallel relationship and bilaterally offset with respect to one another. The depth of the grooves is dependent on the thickness of the panels, and the base of the grooves is advantageously of a semicircular shape. The grooving at right angles to the manufacturing direction takes place in a transverse grooving device 37 disposed separately from the cutting device 34 and provided with a conveying means 36. This arrangement can be seen clearly from FIG. 2.

Also the construction of the double belt press can be seen in greater detail from FIG. 2. The belt arrangement consists of the bottom belt 27 and the height-adjustable top belt 26. The belts 26 and 27 are composed of individual belt plates and revolve by way of roller chains. The belt mold formed by the top and bottom belts is laterally closed off or defined by limiting rubber elements 25 rotating with the bottom belt 27. In order to ensure the lateral seal in the thus-formed in the thus-formed belt when the foaming pressure occurs, the margin-limiting rubber elements 25 are guided by rods disposed on the upper and lower belt plates. The adjustment of the top belt 26 to the desired height of the belt mold is effected, for example, by means of hydraulic cylinders 28, and the fixation of the top belt 26 is accomplished by appropriate spacers.

The thickness adjusting range of the belt mould ranges between 20 mm. and 100 mm. For the different sheet thicknesses to be produced in each individual case, a corresponding pair of margin-limiting rubber elements 25 are required. The belt mold height of the top belt 26, corresponding to the thickness of the foamed sheet, is constant up to a maximally permissible foaming pressure. When this maximally allowable foaming pressure, which is measured by means 44, is exceeded, a larger thickness of the foamed sheet is produced which corresponds to the maximally permissible foaming pressure, by an automatic lifting of the top belt 26 with the aid of hydraulic cylinders 28.

The heat necessary for the foaming and curing process is obtained, interalia, by an intense temperature control of the belt arrangement which is as uniform as possible. The belt temperatures are from about 50° to about 80° C., depending on the phenolic resin foam quality to be produced, in dependence on the recipe of the mixture employed. The belt arrangement is heated, for example, with hot air. The conductance of the hot air can be seen from FIG. 3, wherein the hot-air fan 39 blows the air through the radiator 40, and the hot air is then guided around the belts 26 and 27. Within the belt press, an additional heater 41 is also arranged.

The cover layers provided by sheets 43 and 43 are wound as webs on the take-off devices 14 and 17 and are introduced into the belt press via guide rolls. In order to ensure an accurate feed of the cover sheets 42 and 43 into the belt press, an edge control 15, 18, actuated by pneumatic-hydraulic means, is provided for both cover sheets.

In order to avoid contamination with reaction mixture, the edges of the lower cover sheet 42 are bent upwardly by 90° via the device 20. The edge height is to be chosen so that an overlapping of the foam sheet thickness by about 10 mm. is attained. The reaction mixture is introduced into this box-shaped cover sheet 42. The upper cover sheet 43 introduced via the distributor roll 22 constitutes the lid of the box form which is open at the top. The upright edges of the lower cover layer are then bent inwardly by means of the further device 24 and envelop the edges of the upper cover layer. The mixture expanding in the belt press then pushes the upper cover sheet 43 up to the upper limit of the edges of the lower cover sheet. Due to the foaming pressure which builds up, the upper cover sheet is pressed against the bent strips of the lower cover sheet. Thus, a seal is ensured thereby against any exiting mixture.

In order to improve the adhesive or release effect of the cover sheets 42 and 43 on the phenolic resin foam, apparatus 16 and 19 are arranged directly upstream of the point where the reaction mixture is applied, for the coating or impregnation of the cover sheets with specific substances, e.g. adhesives or release agents.

It will be appreciated that the nature of the phenolic resin, and blowing agent and the acid curing agent are further exemplified in pending application Ser. No. 31,418 filed on Apr. 23, 1970 by two of the inventors in the subject application. Accordingly, this application is incorporated by reference in the subject application.

We claim:
1. In an apparatus for the continuous manufacture of phenolic resin foam wherein the components of the foam are stored in storage means operatively associated with means for mixing the components and for distributing the resulting mixture to a temperature-controllable double belt press having an upper and a lower belt defining a molding zone therebetween, the improvement which comprises means for cooling the phenolic resin component to a desired premix temperature operatively associated with said storage means, a first mixer means downstream of the cooling means for premixing the cooled phenolic resin component with a blowing agent, a second mixer means downstream of the first mixer means for mixing the premix of phenolic resin and blowing agent with foam additives and a curing agent;

distributing means including means operatively associated with said double belt press for directing the foamable resin-containing reaction mixture from the second mixer means onto a substrate of the lower belt of the double belt press, means operatively associated with said double belt press for measuring the foaming pressure between the lower belt and the upper belt of the press and means for adjusting the foaming pressure in response to the measured foaming pressure by varying the vertical spacing between the upper and the lower belt of said double belt press.

2. The apparatus of claim 1, wherein additional means operatively associated with said double belt press are provided for feeding a lower and an upper cover sheet between the foamable reaction mixture and the lower and upper belts, respectively, of the double belt press.

3. The apparatus of claim 2, wherein one take-off means is arranged for each of the upper and lower cover sheets, on the outlet side of the double belt press.

4. An apparatus for manufacturing a resin foam from a foamable resin mixture comprising a temperature-controllable double-band press including upper and lower rotating endless conveyor belts forming a laterally limited longitudinally extending mold interspace, means operatively associated with said double-band press for vertically adjusting the upper belt in dependence on the foaming pressure of the foamable resin mixture in said mold interspace whereby the thickness of the foam produced is varied, supply means operatively associated with said press for supplying said foamable resin mixture to said mold interspace, and measuring means operatively associated with said press for measuring the foaming pressure of the foamable resin mixture in said mold interspace.

5. The apparatus of claim 4, wherein said upper conveyor belt is longitudinally set back with respect to the lower conveyor belt at the inlet of said mold interspace.

6. The apparatus of claim 5, wherein said supply means is located vertically above said lower conveyor belt and in front of said upper conveyor belt.

7. The apparatus of claim 6, wherein said supply means includes a reciprocating nozzle reciprocating transversely to the feeding direction of said belts.

8. The apparatus of claim 4, further comprising means operatively associated with said press for feeding top and bottom cover layers with said foamable mixture into said mold interspace, means for tilting the lateral edges of said bottom cover layer by 90°, said tilting means being arranged upstream of said supply means and said means for feeding said top cover layer and said bottom cover layer are arranged so that said bottom cover layer after passing said tilting means is in a box form with said top cover layer forming a lid for said box form, and folding means downstream of said tilting means for inwardly folding the portions of the lateral edges of said bottom cover layer extending vertically above said lid to enclose said lid.

9. The apparatus of claim 4, further including means operatively associated with said press for heating the foamable resin mixture in said mold interspace.

10. The apparatus of claim 9, further including means operatively associated with said heating means for controlling the amount of heating whereby the temperature of the foamable reaction mixture in said mold interspace is controllable.

11. The apparatus of claim 4, further comprising means operatively associated with said press for feeding a top cover layer between said upper conveyor belt and the foamable resin mixture in said mold interspace, and means for coating said top cover layer with an adhesive or release agent prior to coming into contact with said foamable resin mixture.

12. The apparatus of claim 11, further comprising means operatively associated with said press for feeding a bottom cover layer between said lower conveyor belt and the foamable resin mixture in said mold interspace, and means for coating said bottom cover layer with an adhesive or release agent prior to contact with said foamable resin mixture.

13. An apparatus for manufacturing a resin foam from a foamable resin mixture comprising a temperature-controllable double-band press including upper and lower rotating endless conveyor belts forming a laterally limited longitudinally extending mold interspace, supply means operatively associated with said press for supplying said foamable resin mixture to said mold interspace, measuring means operatively associated with said press for measuring the foaming pressure of the foamable resin mixture in said mold interspace, and means operatively associated with said press for vertically adjusting the upper belt of said double-band press in dependence on the foaming pressure of the foamable resin mixture in said mold interspace whereby the thickness of said mold interspace along the length thereof is varied in dependence on said foaming pressure.

* * * * *